(12) United States Patent
Mak et al.

(10) Patent No.: US 12,586,972 B2
(45) Date of Patent: Mar. 24, 2026

(54) LASER SYSTEM AND METHOD FOR GENERATING LASER PULSES

(71) Applicants: Max-Planck-Gesellschaft zur Förderung der Wissenschaften e.V., Munich (DE); Ludwig-Maximilians-Universität München, Munich (DE); Center for Molecular Fingerprinting; Molekuláris- Ujjlenyomat Kutató Közhasznú Nonprofit Kft., Budapest (HU)

(72) Inventors: Ka Fai Mak, Munich (DE); Ferenc Krausz, Garching (DE); Philipp Steinleitner, Munich (DE); Nathalie Lenke, Munich (DE); Maciej Kowalczyk, Garching (DE); Alexander Weigel, Munich (DE)

(73) Assignees: Max-Planck-Gessellschaft zur Förderung der Wissenschaften e.V., Munich (DE); Ludwig-Maximilians-Universität München, Munich (DE); Center for Molecular Fingerprinting; Molekuláris-Ujjlenyomat Kutató Közhasznú Nonprofit Kft., Budapest (HU)

( * ) Notice: Subject to any disclaimer, the term of this patent is extended or adjusted under 35 U.S.C. 154(b) by 175 days.

(21) Appl. No.: 18/527,850

(22) Filed: Dec. 4, 2023

(65) Prior Publication Data

US 2024/0106181 A1      Mar. 28, 2024

Related U.S. Application Data

(63) Continuation of application No. PCT/EP2022/065280, filed on Jun. 3, 2022.

(30) Foreign Application Priority Data

Jun. 8, 2021    (EP) ..................................... 21178394

(51) Int. Cl.
| | |
|---|---|
| *H01S 3/00* | (2006.01) |
| *H01S 3/0941* | (2006.01) |

(Continued)

(52) U.S. Cl.
CPC .......... *H01S 3/0092* (2013.01); *H01S 3/0014* (2013.01); *H01S 3/0941* (2013.01);

(Continued)

(58) Field of Classification Search
CPC .... H01S 3/0014; H01S 3/0092; H01S 3/1307; H01S 3/1312; H01S 3/1623
See application file for complete search history.

(56) References Cited

U.S. PATENT DOCUMENTS

| | | | |
|---|---|---|---|
| 10,886,690 B2 | 1/2021 | Vasilyev | |
| 11,456,571 B2 * | 9/2022 | Giunta | .................. H01S 3/1106 |

(Continued)

FOREIGN PATENT DOCUMENTS

| | | |
|---|---|---|
| CN | 110137791 A | 8/2019 |
| CN | 110168822 A | 8/2019 |

(Continued)

OTHER PUBLICATIONS

Vasilyev et al., "2-cycle Cr:ZnS Laser with Intrinsic Nonlinear Interferometry," Jan. 2019, OSA Laser Congress 2019, ATu4A.3, p. 1-2. (Year: 2049).*

(Continued)

*Primary Examiner* — Michael Carter
(74) *Attorney, Agent, or Firm* — Pearl Cohen Patentanwälte PartGmbB; Michael McCandlish

(57) ABSTRACT

A laser system generates laser pulses having a determined carrier-envelope-offset, CEO. The laser system includes a (Continued)

Cr-doped II-VI based laser oscillator system having a resonator cavity, which emits laser pulses having a peak power of at least 0.75 MW. The laser system further includes a nonlinear optical element for spectrally broadening at least a part of the emitted laser pulses irradiated onto the nonlinear optical element to provide the laser pulses with octave-spanning spectral components, and a frequency-doubling element for generating second harmonic spectral components of at least a part of the octave-spanning spectral components. In addition, the laser system includes an f-2f-interferometry device for generating a beating signal of at least a part of the overlapping spectral components exiting the frequency-doubling element and interfering with each other at the f-2f-interferomtry device and for determining and/or controlling the CEO of the emitted laser pulses based on the beating signal.

19 Claims, 3 Drawing Sheets

(51) Int. Cl.
| | |
|---|---|
| *H01S 3/102* | (2006.01) |
| *H01S 3/13* | (2006.01) |
| *H01S 3/131* | (2006.01) |

(52) U.S. Cl.
CPC .......... *H01S 3/1024* (2013.01); *H01S 3/1307* (2013.01); *H01S 3/1312* (2013.01)

(56) References Cited

U.S. PATENT DOCUMENTS

| | | | | |
|---|---|---|---|---|
| 2007/0086493 | A1* | 4/2007 | Apolonski ............ | H01S 3/1112 372/18 |
| 2011/0274127 | A1 | 11/2011 | Masuda et al. | |
| 2015/0253645 | A1 | 9/2015 | Coddington et al. | |
| 2019/0356103 | A1 | 11/2019 | Vasilyev | |
| 2021/0124236 | A1 | 4/2021 | Vodopyanov et al. | |
| 2021/0194210 | A1* | 6/2021 | Fermann ............... | H01S 3/0057 |

FOREIGN PATENT DOCUMENTS

| | | |
|---|---|---|
| JP | 2022-171015 A | 6/2002 |
| JP | 2007511079 A | 4/2007 |
| JP | 2007256365 A | 10/2007 |
| JP | 2011002580 A | 1/2011 |
| JP | 2011181691 A | 9/2011 |
| JP | 2020514796 A | 5/2020 |
| JP | 2020516961 A | 6/2020 |

OTHER PUBLICATIONS

Vasilyev et al., "Progress in Cr and Fe doped ZnS/Se mid-IR CW and femtosecond lasers," May 2017, Proceedings of Spie, vol. 10193, p. 101930U-1-101930U-9. (Year: 2017).*

Telle et al., "Carrier-envelope offset phase control: A novel concept for absolute optical frequency measurement and ultrashort pulse generation," Appl. Phys. B 69, pp. 327 to 332, Oct. 1999.

Fortier et al., "Phase stabilization of an octave-spanning ti:sapphire laser," Optics Letters, vol. 28, No. 22, pp. 2198 to 2200, Nov. 2003.

Vasilyev et al., "Progress in Cr and Fe doped ZnS/Se mid-IR CW and femtosecond lasers," Proceedings of Spie, vol. 10193, May 2017.

Muraviev et al., "Massively parallel sensing of trace molecules and their isotopologues with broadband subharmonic mid-infrared frequency combs," Nature Photonics, No. 12, pp. 209 to 214, Mar. 2018.

Vasilyev et al., "2-cycle Cr:ZnS Laser with Intrinsic Nonlinear Interferometry," Laser Congress, Jan. 2019.

Vasilyev, et al., "Octave-spanning Cr:ZnS femtosecond laser with intrinsic nonlinear interferometry," Optica vol. 6, No. 2, pp. 126 to 127, Feb. 2019.

Nagl et al., "Efficient femtosecond mid-infrared generation based on a Cr:ZnS oscillator and step-index fluoride fibers," Optics Letters, vol. 44, Issue 10, pp. 2390 to 2393, May 2019.

Nagl et al., "Directly diode-pumped, Kerr-lens mode-locked, few-cycle Cr:ZnSe oscillator," Optics Express, vol. 27, No. 17, pp. 24445 to 24454, Aug. 2019.

Vasilyev et al., "Middle-IR frequency comb based on Cr:ZnS laser," Optics Express vol. 27, No. 24, pp. 35079 to 35087, Nov. 2019.

Nagl et al., "A New Generation of Ultrafast Oscillators for Mid-Infrared Application," ISBN: 978-3-030-89754-3, Retrieved from the Internet: URL: http:/www2.mpq.mpg.de/APS/data/dissertationen/NaglNathalie.pdf [retrieved on Sep. 26, 2022], Oct. 2020.

Vasilyev et al., "Kerr-lens mode-locked Cr:ZnS oscillator reaches the spectral span of an optical octave," Optics Express, vol. 29, No. 2, Jan. 2021.

European Search Report issued in EP 21 178 394.9, to which this application claims priority, mailed Dec. 6, 2021.

International Search Report and Written Opinion issued in PCT/EP2022/065280, to which this application claims priority, mailed Oct. 6, 2022.

International Preliminary Report on Patentability issued in PCT/EP2022/065280, to which this application claims priority, issued on Nov. 21, 2023.

M. Lamy et al., "Titanium Dioxide Waveguides for Supercontinuum Generation and Optical Transmissions in the Near- and Mid-Infrared," 21st International Conference on Transparent Optical Networks (ICTON), IEEE, pp. 1 to 4, Jul. 2019.

Office Action by the Japanese Patent Office (JPO) issued in JP 2023-576103, which is a counterpart hereof, mailed on Dec. 3, 2024, and English translation thereof.

Decision to Grant by the Japanese Patent Office (JPO) issued in JP 2023-576103, which is a counterpart hereof, mailed on May 13, 2025 and English translation thereof.

Long et al., "Third-order optical nonlinearities in anatase and rutile TiO2 thin films," Thin Solid Films, vol. 517, No. 19, pp. 5601 to 5604, Aug. 2009.

Abe et al., "Nonlinear optical waveguides with rutile TiO2," Oxide-Based Materials and Devices II, SPIE, vol. 7940, pp. 253 to 259, Jan. 2011.

Vasilyev et al., "5-Octave Laser Source Based on Cr: ZnS-GaSe Tandem," Conference on Lasers and Electro-Optics (CLEO), pp. 1 to 2, May 2019.

Vasilyev et al., "Multi-octave infrared femtosecond continuum generation in Cr:ZnS-GaSe and Cr:ZnS-ZGP tandems," Nonlinear frequency generation and conversion: materials and devices XIX, vol. 11264, pp. 13 to 24, Mar. 2020.

Kowalczyk et al., "Low-Noise Carrier-Envelope-Offset-Stabilized Yb:CaF2 Oscillator," IEEE Photonics Technology Letters, vol. 32, No. 13, pp. 823 to 826, Jul. 2020.

Office Action by the Canadian Patent Office (CIPO) issued in CA 3,221,428, which is a counterpart hereof, mailed on Jan. 7, 2025.

* cited by examiner

CEP = 0          CEP = π/2          CEP = π

T = 1/f_rep (t)

16 f_CEO f_rep

18

(f)

LASER SYSTEM AND METHOD FOR GENERATING LASER PULSES

CROSS REFERENCE TO RELATED APPLICATIONS

This application is a continuation application of international patent application PCT/EP2022/065280, filed on Jun. 3, 2022, designating the United States and claiming priority from European patent application EP 21 178 394.9, filed Jun. 8, 2021, and the entire content of both applications is incorporated herein by reference.

TECHNICAL FIELD

Exemplary embodiments of the invention relate to a laser system and a method for generating laser pulses having a determined carrier envelope-offset. The exemplary embodiments are, thus, related to laser technology.

BACKGROUND

Carrier-envelope-offset (CEO) stabilized mode-locked lasers are often used for spectroscopy in the frequency or time domain. In particular, frequency combs operating in the mid-infrared (MIR) spectral region, a region containing the majority of characteristic rotational-vibrational molecular transitions, are useful light sources for spectroscopic applications. Phase-stabilized MIR radiation can be generated by developing high-power femtosecond lasers with actively stabilized carrier-envelope phase, and a subsequent nonlinear conversion of their output to the longer wavelength range (see Muraviev et al., Massively parallel sensing of trace molecules and their isotopologues with broadband subharmonic mid-infrared frequency combs. Nature Photon. 12, 209-214 (2018)). Cr-doped II-VI lasers, with their ultrabroadband emission spectrum centered around 2.3 μm, are particularly suited for generating frequency combs in the MIR (see S. Vasilyev, et al., Octave-spanning Cr:ZnS femtosecond laser with intrinsic nonlinear interferometry," Optica 6, 126-127 (2019)) based on a fiber-pumped laser system. However, using directly diode-pumped Cr-doped II-VI lasers for the generation of frequency combs promises a substantially better locking performance compared to fiber-pumped laser systems due to the reduction in relative intensity noise of the output (see N. Nagl et al., Directly diode-pumped, Ken-lens mode-locked, few-cycle Cr:ZnSe oscillator, Optics Express, 27, 24445 (2019).

In general, the generation of a frequency comb requires the stabilization of the CEO frequency of the driving laser source, which typically is a nontrivial task and can be performed with interferometric techniques. An approach based on Cr-doped II-VI lasers for detecting the CEO is described for instance in U.S. Pat. No. 10,886,690B2, according to which the optical harmonics of the laser output generated inside the nonlinear laser medium are employed to produce beat notes. However, such solutions are limited by a signal-to-noise value of the beat note having only been shown to significantly surpass 30 dB, at a resolution bandwidth of 100 kHz, when generated within a laser amplifier crystal (see S. Vasilyev, et al., Middle-IR frequency comb based on Cr:ZnS laser, Opt. Express 27, 35079-35087 (2019)). The threshold of 30 dB is a usual benchmark value, above which stable phase-locking typically can be ensured.

According to other conventional approaches, which are particularly used for lasers operating at a wavelength shorter than 2 μm, an interferometric configuration involving an f-2f interferometer is typically employed (see H. R. Telle et al., Carrier-envelope offset phase control: A novel concept for absolute optical frequency measurement and ultrashort pulse generation. Appl. Phys. B 69, 327-332 (1999)). This approach is based on the beating between two spectral components, with one of them taken from the original spectrum, and the other generated via the frequency doubling of the original spectrum in a nonlinear medium. Thus, this method requires an ultra-broadband spectrum extending at least over an optical octave, such that the nonlinearly generated frequency component can spectrally overlap with the original component and generate a beat note.

For a conventional oscillator output having a low peak-power compared to amplifier systems, reaching such spectral extent is conventionally achieved by using an optical waveguide, such as an optical fiber, to broaden the pulse's spectrum in a nonlinear manner when propagating through the waveguide in a spatially confined manner (see N. Nagl, K. F. Mak, Q. Wang, V. Pervak, F. Krausz, and 0. Pronin, "Efficient femtosecond mid-infrared generation based on a Cr:ZnS oscillator and step-index fluoride fibers," Opt. Lett. 44, 2390-2393 (2019)). However, such waveguides usually have a very small aperture on the order of a few micrometers, and, thus, minute fluctuations in the pointing of the incidence beam will lead to a different amount of light that is coupled into the waveguide, ultimately affecting the extent of spectral broadening and its stability. Furthermore, the coupling efficiency of light into the waveguide is often limited to values below 70%, leading to an undesired power loss. In addition, propagation inside the nonlinear fiber may lead to strong phase distortions, so that second harmonic and fundamental may not temporally overlap. In that case additional delay compensation is needed, which introduces complexity and noise.

VASILYEV SERGEY ET AL.: "2-cycle Cr:ZnS Laser with Intrinsic Nonlinear Interferometry", LASER CONGRESS 2019 (ASSL, LAC, LS&C), 1 Jan. 2019 (2019-01-01), pages 1-2 describes a laser system having a Cr:ZnS laser oscillator emitting laser pulses having a peak power of 0.5 MW and a Cr:ZnS amplifier for amplifying the laser pulses emitted by the oscillator. It is further described that the nonlinear characteristics of polycrystalline Cr:ZnS enables simultaneous amplification, spectral broadening and nonlinear pulse compression, as well as the generation of optical harmonics. Accordingly, all of these steps are performed in the very same amplifier crystal.

VASILYEV SERGEY ET AL: "Progress in Cr and Fe doped ZnS/Se mid-IR CW and femtosecond lasers", PROCEEDINGS OF SPIE; [PROCEEDINGS OF SPIE ISSN 0277-786X VOLUME 10524], SPIE, US, vol. 10193, 8 May 2017 (2017-05-08), pages 101930U-101930U describes a Cr:ZnS laser system emitting laser pulses having a peak power of 1 MW.

VASILYEV SERGEY ET AL: "Kerr-lens mode-locked Cr:ZnS oscillator reaches the spectral span of an optical octave", OPTICS EXPRESS, vol. 29, no. 2, 14 Jan. 2021 (2021-01-14), page 2458 describes a Cr:ZnS oscillator having a resonator length of about 1.9 m and a repetition rate of about 79 MHz.

JP 2002 171015 A describes a multipass arrangement forming a part of the resonator for reflecting the laser beam multiple times back and forth to increase the beam path length but keeping compact outer dimensions.

SUMMARY

It is, thus, an object of the disclosure to provide solutions for generating laser pulses in the MIR spectral range having a determined carrier envelope-offset at a high stability and low noise at a wavelength range around 2 µm or at longer wavelengths. The solutions shall allow high repetition rates, as well as low technical complexity and low manufacturing costs.

The objective is achieved by a laser system for generating laser pulses having a determined carrier-envelope-offset as disclosed herein. Exemplary embodiments are discussed in detail below.

One exemplary embodiment relates to a laser system for generating laser pulses having a determined carrier-envelope-offset, CEO. The laser system comprises a Cr-doped II-VI based laser oscillator system having a resonator cavity, wherein the laser oscillator system is adapted to emit laser pulses from the resonator cavity having a peak power of at least 0.75 MW. The laser system further comprises a non-linear optical element for spectrally broadening at least a part of the emitted laser pulses irradiated onto the nonlinear optical element to provide the laser pulses with octave-spanning spectral components. In addition, the laser system comprises a frequency-doubling element for generating second harmonic spectral components of at least a part of the octave-spanning spectral components of the spectrally broadened laser pulses when irradiating the spectrally broadened laser pulses onto the frequency-doubling element, such that a part of the second harmonic spectral components spectrally overlap with a part of the remaining octave-spanning spectral components of the laser pulses. Further, the laser system comprises an f-2f-interferometry device for generating a beating signal of at least a part of the overlapping spectral components exiting the frequency-doubling element and interfering with each other at the f-2f-interferomtry device and for determining and/or controlling the CEO of the emitted laser pulses based on the beating signal.

Another embodiment relates to a method for generating laser pulses having a determined carrier-envelope-offset, CEO. The method comprises providing laser pulses having a peak power of at least 0.75 MW and spectral components in the range from 1.8 µm to 2.4 µm emitted from a resonator cavity of a laser oscillator system. The method further comprises spectrally broadening the laser pulses such as to provide the laser pulses with octave-spanning spectral components, and generating second harmonic spectral components of at least a part of the octave-spanning spectral components of the spectrally broadened laser pulses in a frequency-doubling element, such that a part of the second harmonic spectral components spectrally overlap with a part of the remaining octave-spanning spectral components of the laser pulses. In addition, the method comprises generating a beating signal of at least a part of the overlapping spectral components exiting the frequency-doubling element and interfering with each other at an f-2f-interferomtry device, and determining and/or controlling the CEO of the emitted laser pulses based on the beating signal.

The carrier-envelope-offset may be determined and/or controlled in the time domain and/or in the frequency domain. In the time domain, the carrier-envelope-offset is represented by a carrier-envelope-offset phase, CEO phase, which is also referred to as carrier-envelope phase, CEP. The CEP is a phase offset between a carrier optical wave and the envelope, i.e., a temporal evolution of the light wave's amplitude. The light wave's amplitude may be the amplitude of the electric field or the amplitude of the light wave's power, which have their maximum at the same point in time. If a local maximum of the carrier optical wave temporally coincides with the maximum amplitude of the electric field, the carrier-envelope-offset is defined as zero. A shift in the phase of the oscillation with respect to the maximum electric field results in a non-zero CEP. As the CEP is a phase and, thus, relates to an angle, its quantity is typically specified in radians. In the frequency domain, the CEO is determined by a carrier-envelope-offset frequency, CEO frequency, $f_{CEO}$. The quantity of the CEO frequency $f_{CEO}$ is typically specified in Hertz. The CEO frequency $f_{CEO}$ may for instance vary between 0 Hz and the repetition rate of the laser oscillator system. A CEO frequency $f_{CEO}$ stabilized to 0 Hz results in the CEP being stabilized to a fixed value, i.e., that the CEP does not vary for the laser pulses. Likewise, the CEO frequency $f_{CEO}$ being stabilized at a frequency being equal to the repetition rate of the laser oscillator frequency $f_{rep}$ results in the CEP being the same for the different laser pulses. However, an uncontrolled CEO frequency $f_{CEO}$ or a CEO frequency $f_{CEO}$ being stabilized to a frequency differing from 0 Hz and from the repetition rate $f_{rep}$ will result in the CEP varying from pulse to pulse. Thus, controlling the CEO frequency $f_{CEO}$ to a specific value (not equal to 0 and the repetition rate) will result in the CEP having a determined fluctuation and only stabilizing the CEO frequency $f_{CEO}$ to 0 or to the repetition rate $f_{rep}$ results in a constant CEP. On the other hand, controlling the CEO in time domain to a specific CEP has the consequence that the CEO frequency is necessarily stabilized. For some applications, controlling the CEO may require stabilizing the CEP to a predetermined value, while for other applications controlling the CEO frequency $f_{CEO}$ may be sufficient and/or advantageous.

The CEO being determined means that the CEO is known and may be taken into consideration when using the laser pulses. Thus, in some exemplary embodiments the CEO may be controlled and for instance set at a predetermined value. In some other exemplary embodiments, the CEO may be measured and any fluctuation of the CEO may be taken into account in an application of the laser pulses.

A laser oscillator system is a laser oscillator providing laser activity within a gain medium in a resonator cavity. The laser oscillator system does not comprise any external amplification of the laser pulses after out-coupling from the resonator cavity. The laser oscillator system may comprise external pumping means, such as a pump laser, wherein the pump laser may be a part of the laser oscillator system or may be provided separately from the laser oscillator system. For instance, the laser oscillator system may be directly diode-pumped by radiation provided by light emitting diodes and/or laser diodes.

A Cr-doped II-VI based laser oscillator system is a laser oscillator system having a Cr-doped II-VI gain medium. The Cr-doped II-VI gain medium comprises a II-VI bulk medium doped with chromium atoms. The II-VI medium is composed of chemical elements of the $2^{nd}$ main group and the $6^{th}$ main group of the periodic table. The II-VI medium may comprise a II-VI crystal doped with chromium. In some optional exemplary embodiments the Cr-doped II-VI based laser oscillator system comprises a gain medium comprising or consisting of Cr-doped ZnS and/or Cr-doped ZnSe. However, according to other exemplary embodiments different II-VI materials may be used. The Cr-doped II-VI gain medium allows a broad spectral range for laser activity from about 1.8 µm to about 3.0 µm and is therefore well suited for the generation of laser pulses in the MIR spectral range, in particular for the generation of femtosecond laser pulses in the MIR spectral range. However, alternatively or additionally one or more other gain media may be used, as long as they are suitable for the generation of laser pulses in the MIR spectral range spectrally supporting a femtosecond pulse duration.

The laser pulses being emitted from the resonator cavity of the laser oscillator system having a peak power of 0.75 MW means that the laser pulses having the peak power can be provided solely by the laser oscillator system without the need of any additional external amplification (such as an external amplifier stage). For instance, the laser oscillator system may have a repetition rate of 50 MHz or less for providing laser pulses having a peak power of 0.75 MW or more.

Spectral components in the range from 1.8 µm to 2.4 µm being emitted from a resonator cavity means that the radiation emitted from the resonator cavity spectrally covers at least a part of the range from 1.8 µm to 2.4 µm. The spectral components may cover the entire range from 1.8 µm to 2.4 µm or a part of the range. The laser pulses having spectral components in the range from 1.8 µm to 2.4 µm further does not exclude that laser pulses may have further spectral components outside the range from 1.8 µm to 2.4 µm, such as spectral components having a longer and/or a shorter wavelength.

A nonlinear optical element is an optical element having a non-zero nonlinear refractive index. In particular, the nonlinear optical element may have a second order refractive index $n_2$ suitable for carrying out nonlinear optical applications based on the laser pulses. For instance, the second order refractive index $n_2$ may be at least $10^{-15}$ cm$^2$/W in order to carry out the desired nonlinear optical applications, such as spectral broadening via self-phase-modulation, and/or multiple wave mixing.

Spectrally broadened laser pulses having octave-spanning spectral components means that the frequency spectrum of the spectrally broadened laser pulses extends at least from a first frequency to a second frequency, wherein the second frequency is twice as high as the first frequency. Throughout this disclosure a spectrum is considered to extend until a certain frequency, at which the spectral intensity equals 0.001 times the maximum spectral intensity. In other words, the spectrum of laser pulses is considered to extend until a wavelength or frequency, at which the spectral intensity is attenuated by 30 dB, i.e., a factor of 1.000, compared to the maximum spectral intensity.

A frequency doubling element is a nonlinear optical element suitable and/or optimized for the nonlinear optical generation of second harmonic spectral components of the laser pulses. The frequency doubling element may be optimized with respect to the material and/or cutting angle and/or thickness to achieve a desired conversion of spectral components of laser pulses propagating through the frequency doubling element into second harmonic spectral components having twice the frequency of the fundamental spectral components of the laser pulses.

The second harmonic spectral components spectrally overlapping with a part of the remaining octave-spanning spectral components of the laser pulses means that a specific wavelength range and frequency range is covered by fundamental spectral components of the laser pulses as well as by the generated second harmonic spectral components.

An f-2f-interferometry device is a device allowing the generation and detection of a beating signal of at least a part of the spatially and temporally overlapping (fundamental) spectral components of the laser pulses and the second harmonic spectral components. The f-2f-interferometry device does not require two separate interferometer arms. Instead, the f-2f-interferometry device may be adapted such that both the fundamental spectral components of the laser pulses and the second harmonic spectral components propagate in one and the same interferometer arm. The f-2f-interferometer may comprise a detector for detecting at least the overlapping spectral components generating the beating signal as an electric signal which may be evaluated by electric and/or electronic circuitry. For instance, the beating, in particular a frequency of the beating signal, may depend on the CEO of the laser pulses. In particular, the frequency of the beating signal may correspond to the CEO frequency $f_{CEO}$. The beating signal may have a frequency in the radio frequency range.

Exemplary embodiments provide the advantage that laser pulses having a determined carrier-envelope-offset may be generated in the mid-infrared having a low-noise, i.e., exhibiting no CEO fluctuations or CEO fluctuations at a low level. In particular a laser system according to an exemplary embodiment may exhibit a CEO phase noise (integrated between 1 Hz and 1 MHz) of 200 mrad or less, optionally 100 mrad or less, optionally 50 mrad or less and optionally even 30 mrad or less. This is in particular favored by using the laser pulses emitted by the Cr-doped II-VI based laser oscillator system having a peak power of at least 0.75 MW. Due to the high peak power of the laser pulses emitted from the laser oscillator system the laser pulses may be directly used for generating the octave-spanning spectral components and for frequency doubling without the need of an additional external laser amplification besides the laser oscillator system. Accordingly, the exemplary embodiments do not require an external laser amplifier stage and, by this, an additional source of noise and CEO-fluctuations may be avoided. Moreover, as no additional laser amplifier stage is required, the complexity, the spatial extensions and the manufacturing costs for the laser system for generating laser pulses having a determined CEO may be kept at a low level. In particular due to the spectral wavelength range in MIR, the laser system may open new applications of CEO stabilized laser pulses for spectroscopic applications in a cost-sensitive environment and/or in environments requiring small spatial extension of the laser system.

In particular when using a directly diode-pumped mode-locked Cr-doped II-VI laser oscillator systems a low noise level combined with a compact size and low manufacturing costs may be achieved.

Moreover, the exemplary embodiments provide the advantage that in particular due to the high peak power of the laser pulses provided directly from the laser oscillator system, no need for using optical waveguides (typically having a length of 1 cm or more) is given to achieve the required spectral broadening for obtaining the octave-spanning spectral components. Instead, bulk nonlinear optical elements having a thickness of less than 1 cm may be used, which offer lower optical losses than optical waveguides. This provides the further advantage that the exemplary embodiments do not necessarily require a compensation for differences in the optical path lengths of a waveguide often originating in the high optical dispersion of such waveguides. The conventional use of waveguides for spectral broadening would require splitting the fundamental spectral components and the second harmonic spectral components into two separate interferometer arms allowing a compensation of the different optical path lengths originating in the optical dispersion before recombining them for generating a beating signal. However, also this disadvantage of conventional systems can be avoided by the exemplary embodiments, as they do not require optical waveguides for achieving the desired spectral broadening. The exemplary embodiments may thus provide only a single mutual interferometer arm of the f-2f interferometry for the fundamental spectral components and the second harmonic spectral components, which allows keeping the complexity at a low level and avoids the generation of additional noise in the beating signal that would originate from separate interferometer arms. Hence, the exemplary embodiments allow achieving a high stability of the CEO stabilization and/or CEO determination. Some exemplary embodiments provide the advantage that the CEO can be stabilized such the total variations of the CEO are as low as 200 mrad or less, i.e., that an integrated phase noise of the stabilized CEO frequency integrated in a range from 1 Hz to 1 MHz is 200 mrad or less. Optionally, the integrated phase noise may be 100 mrad or less, optionally 50 mrad or less and optionally 30 mrad or less.

Moreover, due to the nonlinear optical element for spectral broadening and the frequency doubling element being provided as separate elements the disclosure provides the advantage that the process of spectral broadening and the process of frequency doubling may be optimized independently of each of other. In other words, the nonlinear optical element for spectral broadening may be optimized to yield a highly efficient spectral broadening, while the frequency doubling element may be optimized to yield a highly efficient frequency doubling of the spectrally broadened laser pulses. This allows achieving the specified high peak power in the laser oscillator system without requiring additional external amplification, which would possibly be detrimental for the CEO stabilization. In addition, the nonlinear optical element for spectral broadening as well as the frequency doubling element may be separate from a gain medium in the laser oscillator system, i.e., there is no amplification of the laser pulses occurring in the nonlinear optical element for spectral broadening and in the frequency doubling element. This allows optimizing the gain of the laser amplification in the laser oscillator system independently of the spectral broadening and the frequency doubling and vice versa.

In some exemplary embodiments the overlapping second harmonic spectral components exiting the frequency-doubling element propagate collinearly and temporally overlapping with the residual fundamental spectral components along a common optical path. In other words, the fundamental spectral components of the laser pulses and the second harmonic spectral components are not split up into two different interferometer arms. This allows keeping the noise, i.e., possible fluctuations of the beating signal and, thus, of the CEO frequency, at a very low level. Hence, this allows further improving the stability of the laser pulses regarding their CEO.

In some exemplary embodiments the beating signal is generated only by the interfering overlapping spectral components of the second harmonic spectral components and the octave-spanning spectral components of the laser pulses remaining after the frequency-doubling element. In other words, there is no need of splitting the laser beam to provide separate parts of the fundamental laser pulses for generating the second harmonic spectral components and for providing the fundamental beam for the f-2f-interferometry device for generating the beating signal. Instead, the fundamental laser pulses remaining after the generation of the second harmonic spectral components may be used for the generation of the beating signal. This allows keeping the noise at a very low level. Hence, this allows further improving the stability of the laser pulses regarding their CEO.

In some exemplary embodiments the laser system further comprises a spectral filter element for spectrally filtering the overlapping spectral components prior to generating the beating signal. In some exemplary embodiments the spectral filter element may comprise or consist of a spectral bandpass filter. This may allow reducing and/or avoiding a possible influence of spectral components not contributing to the generation of the beating signal. Hence, this may allow further reducing the noise.

In some exemplary embodiments controlling the CEO of the emitted laser pulses comprises adjusting the laser oscillator system such as to emit laser pulses having a predetermined CEO. For instance, in some exemplary embodiments adjusting the laser oscillator system may comprise adjusting an internal dispersion of the resonator cavity and/or adjusting a pumping power for pumping the gain medium of the laser oscillator system and/or adjusting an internal optical loss of the resonator cavity. This provides means for efficiently controlling the CEO of the laser pulses. For instance, the internal optical loss of the resonator may be controlled using an acousto-optical modulator within the resonator cavity.

In some exemplary embodiments controlling the CEO comprises stabilizing the CEO to a predetermined CEO, i.e., to a predetermined CEO frequency and/or a predetermined CEP. For instance, the CEO may be controlled such that the CEO frequency is zero or close to zero. This provides the advantage that the waveform of the laser pulses may be stabilized in a periodic or constant manner, i.e., that pulse-to-pulse fluctuations of the waveform may be reduced or minimized. Moreover, the CEP may be controlled such that the CEP is zero or close to zero. This may provide the advantage that a maximum amplitude of the electric field can be obtained at the maximum of the temporal envelope. However, according to exemplary embodiments the CEO may be controlled such as to be stabilized at a CEO frequency and/or a CEP different from zero. For some applications, having a constant CEO frequency and/or a constant CEP may be advantageous, while the specific value of the CEO frequency and/or the CEP are of minor importance. Stabilizing the CEO to a non-zero frequency/phase angle may reduce the technical effort for such applications. According to yet other exemplary embodiments the CEO may be controlled not to be static but to vary in a predetermined manner. This may be beneficial for applications involving different CEO frequencies.

In some exemplary embodiments the nonlinear optical element for spectrally broadening has a thickness of 1 mm or less. This may provide the advantage that a high quality of the beam profile of the laser pulses may be maintained after spectral broadening in the nonlinear optical element, i.e., that a high beam quality factor $M^2$ close to 1.2 may be maintained. This may be particularly advantageous if only a part of the spectrally broadened laser pulses is used for determining and/or controlling the CEO, while another part of the spectrally broadened laser pulses is used for an intended application, such as an experimental, spectroscopic, medical and/or machining application. Moreover, this may increase the radiation coherence allowing achieving a better signal-to-noise ratio of the beating signal. However, according to other exemplary embodiments a thicker nonlinear optical element may be chosen in order to enhance the spectral broadening. For instance, a thickness between 1 mm and 2 mm may be chosen.

In some exemplary embodiments the nonlinear optical element for spectrally broadening comprises or consists of rutile $TiO_2$. A nonlinear optical element comprising or consisting of $TiO_2$ offers a high nonlinear refractive index $n_2$ of about $10^{-14}$ cm$^2$/W (for rutile crystal structure) and a suitable transparency for laser pulses in the mid-infrared spectral range. In particular, the nonlinear optical element may therefore comprise or consist of rutile. This may provide advantageous properties for spectral broadening of laser pulses emitted by a Cr-doped II-VI laser oscillator system having a central wavelength in the range from about 1.8 µm to 2.6 µm towards shorter wavelengths, i.e., in a spectral range below the fundamental wavelength spectrum of the laser pulses emitted by the laser oscillator system. For instance, the $TiO_2$ and in particular rutile based nonlinear optical element may be used for spectrally broaden the laser pulses to a wavelength down to about 1.2 µm (30 dB attenuation with respect to maximum of spectral power distribution). In addition, the $TiO_2$ and in particular rutile based nonlinear optical element may provide spectral broadening towards longer wavelengths further into the MIR spectral range.

In some exemplary embodiments the Cr-doped II-VI based laser oscillator system may comprise an imaging unit forming part of the resonator cavity, wherein the imaging unit is adapted to decouple a spot size of an intra-cavity laser beam at a gain medium from an intra-cavity length of the resonator cavity, and wherein the resonator cavity and the imaging unit are adapted such that the laser oscillator system emits laser pulses at a repetition rate of 50 MHz or less. An imaging unit is, thus, an optical configuration for extending the length of the resonator cavity (also referred to as intra-cavity length) and by this reducing the repetition rate of the laser pulses emitted by the laser oscillator system. The imaging unit may be adapted to image the intra-cavity laser beam such as to maintain at least to some degree a transversal mode and/or a beam profile of the intra-cavity laser beam. The imaging unit may comprise transmissive optical elements, such as one or more optical lenses, and/or reflective optical elements, such as flat and/or curved mirrors. The imaging unit may be integrated into the resonator cavity. In some exemplary embodiments, the imaging unit may comprise at least one of the end mirrors of the resonator cavity. This allows a facilitated integration of the imaging unit into the resonator cavity and may allow a facilitated adjustment of the resonator length and, hence, the repetition rate of the laser oscillator system. The imaging unit may be adapted such that a position of an image plane of the end mirror of the resonator cavity, which is included in the imaging system, remains unchanged when adjusting the length of the imaging unit and accordingly the length of the resonator. By this, the spatial properties of the mode of the laser radiation in the resonator cavity and in particular at the gain medium may be kept constant for different length adjustments by the imaging unit. Hence, the imaging allows reducing the repetition rate of the laser oscillator system which may result in a higher energy per laser pulse and accordingly a higher peak power than in conventional laser oscillator systems having a higher repetition rate. Consequently, providing the imaging unit in the resonator cavity may allow achieving the laser pulses having a peak power of 0.75 MW or more directly emitted from the Cr-doped II-VI laser oscillator system without the need of further amplification.

The imaging unit may include one of the end mirrors of the resonator cavity. Moreover, the imaging unit may be adapted to image the end minor of the resonator cavity included in the imaging unit to an image plane. This may allow maintaining a distance of the image plane from another end mirror of the resonator cavity unchanged when adapting a length of the resonator cavity by the imaging unit.

Hence, this allows entirely decoupling a mode size of the laser radiation in the resonator cavity and in particular a size of the laser beam or laser pulses at the gain medium for different resonator lengths adjusted by the imaging unit.

The laser oscillator system emitting laser pulses at a repetition rate of 50 MHz or less means that the laser oscillator system is operated in a pulsed mode, for instance in a mode-locked operation, wherein the frequency, at which the laser pulses are emitted from the laser oscillator system is 50 MHz or less. Accordingly, a time distance between two consecutively emitted laser pulses is about 20 ns or more.

In some exemplary embodiments the laser oscillator system is adapted to emit laser pulses having a pulse duration of 40 fs FWHM or less. This allows achieving a peak power of 0.75 MW or more at moderate pulse energies. Moreover, a pulse duration of 40 fs or less allows efficiently driving nonlinear optical processes, such as spectral broadening and/or multiple wave mixing applications.

In some exemplary embodiments the laser system is adapted such that the beating signal has a signal-to-noise ratio of 40 dB or more measured at a radio-frequency resolution bandwidth of 100 kHz. This may be achieved in particular by reducing and/or avoiding noise, as mentioned in the above-presented exemplary embodiments. In particular the avoidance of an external laser amplification stage and/or the avoidance of separate interferometer arms at the f-2f-interferometer allows reducing the noise and achieving a signal-to-noise ratio of 40 dB or more measured at a radio-frequency resolution bandwidth of 100 kHz. This renders the laser pulses favorable for various applications sensitive to small changes of the CEO. This may be particularly advantageous for reaching a stability of the CEO, such that an integrated phase noise of the CEO frequency is 30 mrad or less.

It is understood by a person skilled in the art that the above-described features and the features in the following description and figures are not only disclosed in the explicitly disclosed exemplary embodiments and combinations thereof, but that also other technically feasible combinations as well as the isolated features are comprised by the disclosure. In the following, several exemplary embodiments and specific examples are described with reference to the figures for illustration without limiting the invention to the described exemplary embodiments.

BRIEF DESCRIPTION OF THE DRAWINGS

The disclosure will now be described with reference to the drawings wherein.

DESCRIPTION OF EXEMPLARY EMBODIMENTS

Figure 1A:
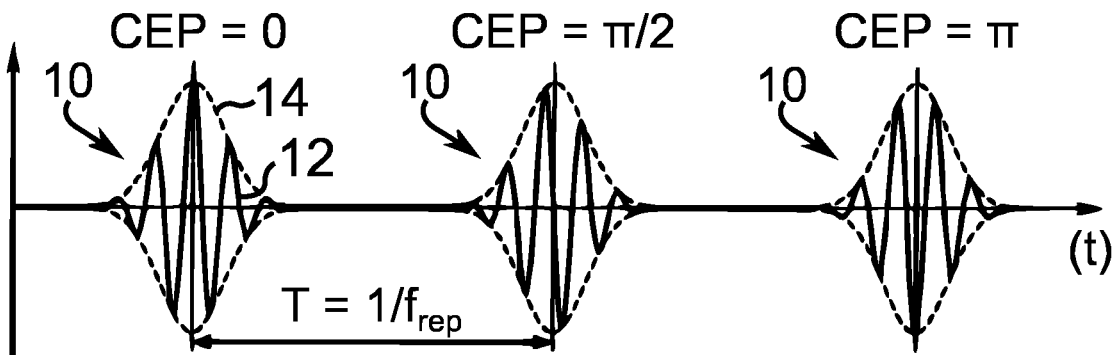
FIGS. 1A and 1B schematically illustrate the physical principle of a carrier-envelope-offset, i.e., the CEP and the CEO frequency.

In the drawings the same reference signs are used for corresponding or similar features in different drawings.

Figure 1B:
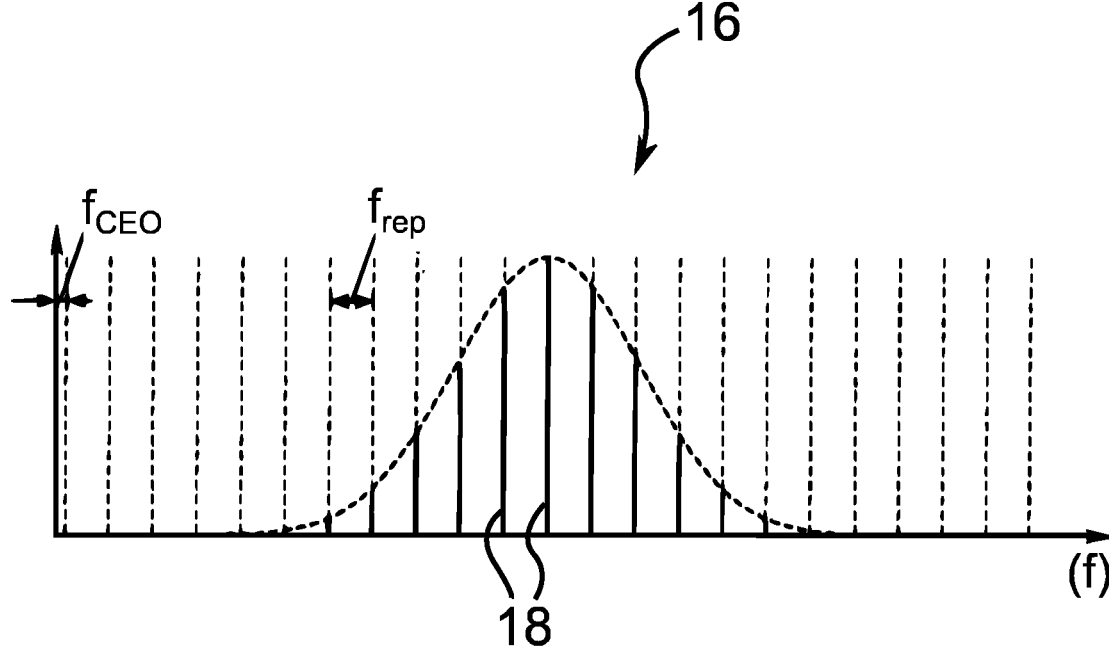

FIGS. 1A and 1B schematically illustrate the physical principle of a carrier-envelope-offset, which is also referred to as the carrier-envelope phase. FIG. 1A illustrates a train of optical pulses 10, i.e., laser pulses 10, emitted by a mode-locked femtosecond laser oscillator system according to an exemplary embodiment. The temporal distance T between two consecutive laser pulses 10 is given by the reciprocal value of the repetition rate $f_{rep}$.

A carrier optical wave 12 (solid line) oscillates at a frequency determined by the central wavelength of the laser pulses. The carrier optical wave 12 is modulated by a periodic envelope 14 (dashed line) at a pulse repetition frequency $f_{rep}$. The oscillation of the carrier optical wave 12 and the envelope 14 each have a periodic phase and accordingly the carrier optical wave 12 and the envelope phase 14 have a relative phase relationship expressed by the carrier-envelope offset CEO.

The three indicated laser pulses 10 have different values of the CEP. The laser pulse 10 at the left side exhibits a CEP=0, which results in the carrier optical wave 12 and the envelope 14 being in phase such that both exhibit a local maximum at the same point in time. As can be seen, for CEP=0 the maximum of the envelope 14 coincides in time with a maximum of the carrier optical wave 12. Hence, the phase shift between the carrier optical wave 12 and the envelope 14 and, thus, the CEP is zero.

The laser pulse 10 shown in the middle exhibits a CEP=$\pi$/2, which means that the phase of the carrier optical wave 12 is shifted with respect to the envelope by a factor of $\pi/2$. Accordingly, the maximum of the envelope 14 coincides with a zero-crossing of the carrier optical wave 12.

The laser pulse 19 illustrated at the right-hand side exhibits a CEP=$\pi$, which results in the maximum amplitude of the carrier optical wave 12 in the negative direction, i.e., a local minimum, coinciding in time with the maximum of the envelope 14.

Therefore, FIG. 1A illustrates that the temporal evolution and in particular the maximum electrical field of a laser pulse 10 may vary significantly with different values of the CEP albeit the envelope 14 remains unchanged.

FIG. 1B schematically depicts the laser pulses 10 of FIG. 1A in the frequency domain, i.e., the Fourier transform of the signal presented in FIG. 1A. The vertical axis shows the spectral power density 16 over the frequency f shown at the horizontal axis. The spectral power density 16 comprises a comb of multiple equally spaced spectral components 18, wherein the spacing between the individual spectral components 18 is equal to the repetition rate of the laser oscillator system $f_{rep}$. In addition, all individual spectral components have a common offset given by the CEO frequency $f_{CEO}$. The CEO frequency $f_{CEO}$, which represents an initial offset frequency, illustrated in FIG. 1B, indicates a frequency spacing of the first frequency component from the zero point at the frequency scale. It is typically in the spectral range of radio frequencies and, thus, may be measured by using conventional electronics. This offset-frequency $f_{CEO}$ may in particular be determined by measuring the frequency of the beating signal generated in an f-2f-interferometer device by overlapping spectral components of the (octave spanning) laser pulses and second harmonic spectral components generated by the octave spanning laser pulses.

Stabilizing the CEO frequency $f_{CEO}$ allows stabilizing the waveform of the laser pulses in a periodic and/or a constant manner, which may be achieved by carrying out controlled adjustments of the laser oscillator system based on the measured beating signal. Moreover, stabilizing the CEO frequency to zero or to $f_{rep}$ allows stabilizing the CEP.

Figure 2:
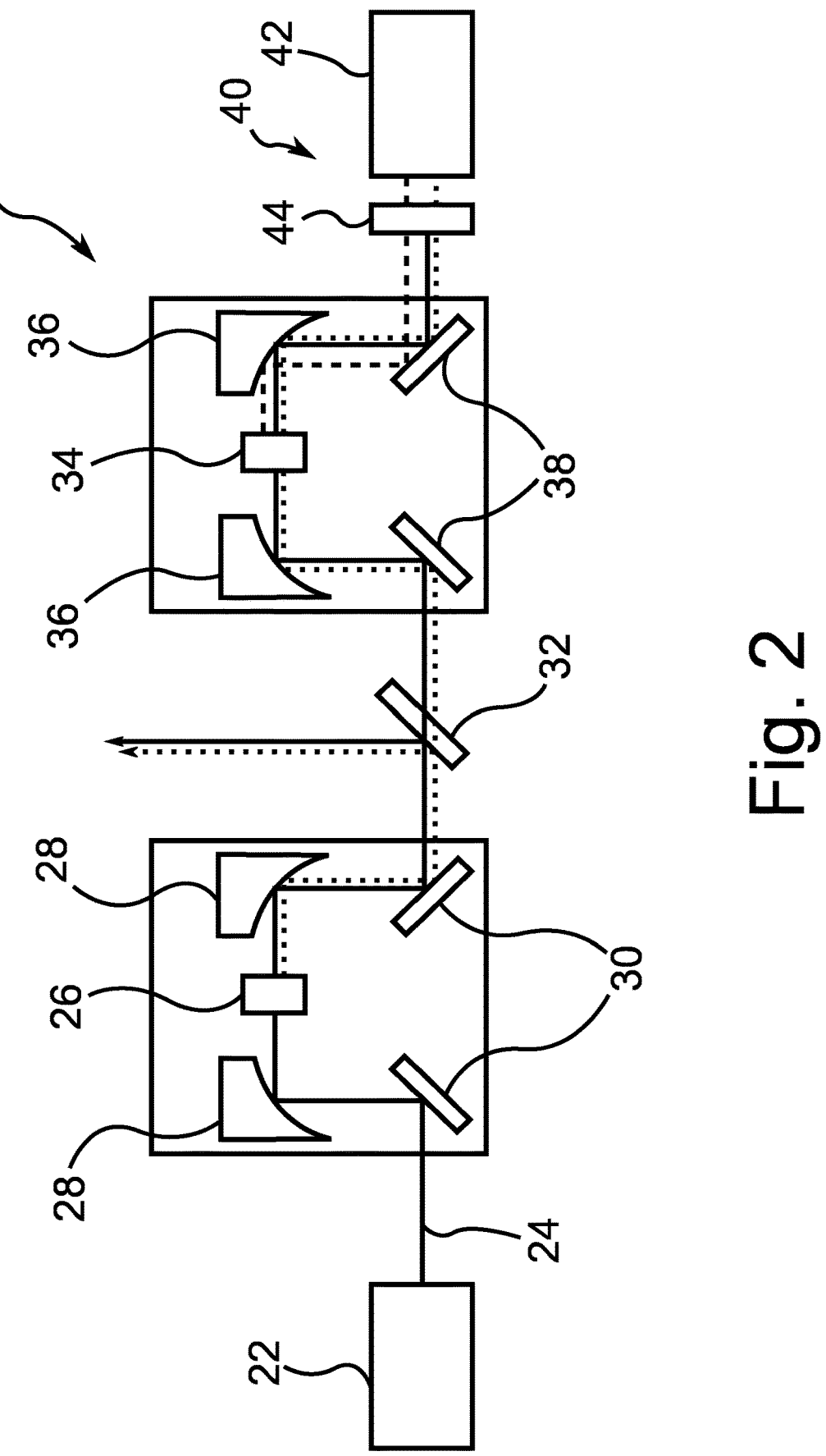
FIG. 2 schematically depicts a laser system for generating laser pulses having a determined CEO according to an exemplary embodiment.

FIG. 2 schematically depicts a laser system 20 for generating laser pulses having a determined CEO according to an exemplary embodiment. The laser system 20 includes a Cr-doped II-VI based laser oscillator system 22 having a resonator cavity, wherein the laser oscillator system 22 is adapted to emit laser pulses from the resonator cavity having a peak power of at least 0.75 MW. The Cr-doped II-VI laser oscillator system 22 may comprise a directly diode-pumped gain medium formed of a Cr-doped ZnS or ZnSe crystal. A more detailed explanation of the laser oscillator system 22 is provided below with reference to FIG. 3. The optical path 24 of the emitted laser pulses is indicated by a solid line.

The laser system 20 further comprises an arrangement for spectrally broadening the laser pulses, wherein the arrangement comprises a nonlinear optical element 26, two optical elements 28 for focusing the laser pulses onto the nonlinear optical element 26 and for collimating the laser pulses after the nonlinear optical element 26. In addition, the arrangement comprises two steering minors 30 for controlling the propagation path of the laser pulses through the focusing optical elements 26 and through the nonlinear optical element 26. The spectrally broadened components of the laser pulses are symbolized by a dotted optical path.

The nonlinear optical element 26 is optimized for spectrally broadening the laser pulses propagating through the nonlinear optical element 26. As the laser pulses emitted by the laser oscillator system 22 cover a spectral range from about 2.0 $\mu$m to about 2.6 $\mu$m, the nonlinear optical element 26 is formed of bulk rutile $TiO_2$ having a thickness of about 0.5 mm providing suitable properties for achieving a significant spectral broadening of the laser pulses in particular to shorter wavelengths. The nonlinear optical element 26 being formed of bulk $TiO_2$ means that the nonlinear optical element 26 according to the presented exemplary embodiment does not apply any spatial confinement of the laser beam propagating through the nonlinear optical element 26 in contrast to the conventional use of photonic fibers etc.

In particular, focusing the laser pulses into the nonlinear optical element 26 provides a spectral broadening such that the spectrally broadened laser pulses cover a spectral range spanning at least an optical octave, such as spanning a spectral wavelength range from at least 1.2 $\mu$m to at least 2.6 $\mu$m.

A beam splitter 32 is arranged after the arrangement for spectral broadening to branch off a first part of the power of the laser pulses for the further use in the intended application by reflecting the first part to a desired direction. A second part of the power of the laser pulses is transmitted through the beam splitter 32 and is used for determining and/or controlling the CEO of the emitted laser pulses. Alternatively or additionally, a part of the power of the laser pulses may be branched off prior to the spectral broadening. This may be advantageous if the use of CEO stabilized laser pulses as emitted from the laser oscillator system 22 without further spectral broadening is intended. For this purpose, the beam splitter 32 or an additional beam splitter (not shown) may be arranged between the laser oscillator system 22 and the arrangement for spectral broadening. The transmitted part of the power of the laser pulses has to be sufficient for spectrally broadening the laser pulses and a subsequent generation of second harmonic spectral components. The remaining part of the power of the laser pulses is available for the intended use, such as spectroscopic, medical and/or machining applications.

In a next step, the laser pulses enter an arrangement for frequency doubling. The arrangement comprises a frequency-doubling element 34, two optical elements 36 for focusing the laser pulses into the frequency-doubling element 34 and for collimating the laser pulses after the frequency-doubling element 34, as well as two steering minors 38 for controlling the beam propagation path through the frequency-doubling element 34. According to the presented exemplary embodiment the frequency-doubling element 34 is a nonlinear optical element adapted to perform second harmonic generation from the laser pulses propagating through the frequency-doubling element 34. The material and/or thickness and/or cutting angle and/or periodic structure of the frequency-doubling element may be optimized with respect to the central wavelength of the laser pulses and the desired conversion efficiency. For instance, the frequency-doubling element may be formed of a periodically-poled lithium niobate (PPLN) nonlinear optical crystal having a poling period, of 36 μm, and a thickness of 1 mm.

After the frequency-doubling element 34, the remaining octave-spanning spectral components of the laser pulses (the fundamental laser pulses) and the generated second harmonic spectral components propagate in a collinear manner. This is indicated by the collinearly extending dashed line indicating the optical path of the second harmonic spectral components.

Due to the spectrally broadened laser pulses spectrally covering at least a full optical octave, a part of the generated second harmonic spectral components and the octave-spanning spectral components of the spectrally broadened laser pulses have a spectral overlap region. In other words, to some extent the fundamental spectral components of the spectrally broadened laser pulses and also the generated second harmonic spectral components will cover the very same spectral wavelength range. This spectral overlap range will be at the short-wavelength side of the spectrally broadened laser pulses. Moreover, the spectrally broadened laser pulses and also the generated second harmonic spectral components spatially and temporarily overlap with each other.

These collinearly propagating spectral components of the laser pulses and of the second harmonic spectral components having a spectral, spatial and temporal overlap are then used for generating the beating signal in an f-2f-interferometry device 40. Due to their collinear propagation direction, their spatial overlap and their temporal overlap, which is achieved by keeping the optical dispersion during frequency-doubling at a low level, no further measures have to be taken for achieving the spatial, temporal and spectral overlap required for the f-2f-interferometry. The f-2f-interferometry device 40 comprises a photodiode 42 for detecting the impinging overlapping spectral components having a spatial, temporal and spectral overlap at the detection surface of the photo-diode 42 and, thus, generate a beating signal in the radio-frequency range which can be detected based on the output-signal of the photo-diode 42. The laser system may further comprise an optional spectral filter element 44, which may be an optical bandpass filter 44, for isolating the spectrally overlapping spectral components from the other remaining spectral components of the laser pulses and the generated second harmonic spectral components, which are not usable for the generation of the beating signal.

In the following, the frequencies of the beating signal and the involved spectral components will be explained.

Due to the pulsed laser operation the laser pulses have a spectrum representing a frequency comb having multiple frequency spikes, as illustrated in FIG. 1B. The frequency spectrum of the octave-spanning spectrally broadened laser pulses, thus, contains a frequency spike at the frequency $$f = f_{CEO} + n \cdot f_{rep}$$

and further a frequency spike at twice the frequency:

$$2f = f_{CEO} + 2n \cdot f_{rep}$$

The parameter $f_{CEO}$ indicates the frequency offset according to the CEO, $f_{rep}$ represents the repetition rate or repetition frequency of the laser pulses emitted by the laser oscillator, and n is an integer $\geq 1$ indicating that the frequency is the $n^{th}$ frequency spike, i.e., the $n^{th}$ multiple of the repetition rate (not regarding the frequency offset).

The second harmonic frequency 2f' generated by frequency-doubling of the above-mentioned fundamental frequency spike having the frequency f can be written as follows:

$$2f' = 2 \cdot f = 2 \cdot f_{CEO} + 2 \cdot n \cdot f_{rep}$$

Thus, it is apparent that the frequency 2f contained in the fundamental, octave-spanning spectrally broadened laser pulses and the frequency 2f' generated by frequency-doubling differ from each other by the CEO frequency $f_{CEO}$, which represents the beating signal:

$$2f' - 2f = f_{CEO}$$

Consequently, the CEO frequency directly corresponds to the beating signal, which is generated in the f-2f-interferometry device and can be made available as an electronic signal by the f-2f-interferometry device. Determining and/or controlling and/or stabilizing the beating signal, thus, allows determining and/or controlling and/or stabilizing the CEO of the laser pulses in the time domain.

Determining and/or controlling and/or stabilizing the CEO may be carried out adjusting the laser oscillator system such as to stabilized and/or control the beating signal to a predetermined frequency, such as a frequency of zero. Adjusting the laser oscillator system may comprise adjusting an internal dispersion of the resonator cavity and/or adjusting a pumping power for pumping the gain medium of the laser oscillator system and/or adjusting an internal optical loss of the resonator cavity. This may ensure that the laser pulses emitted by the laser oscillator system exhibit a determined CEO.

The presented exemplary embodiment provides the advantage that it offers a minimal power loss and is insensitive to beam-pointing fluctuations. Moreover, the output beam, having retained a good spatial profile and ultrashort pulse durations, can also be utilized for other intended applications apart from beat-note detection. Additionally, due to the short propagation length through the nonlinear optical element for spectral broadening, a possible walk-off between the frequency components may be minimized which allows achieving a high spatial and temporal overlap of the spectral components of the laser pulses and of the generated second harmonic spectral components without the need of separate adjustments to the individual optical paths. This supports achieving a high signal-to-noise ratio of the detected CEO beat note and hence gives possibility to achieve low-noise operation in a stabilized case.

Figure 3:
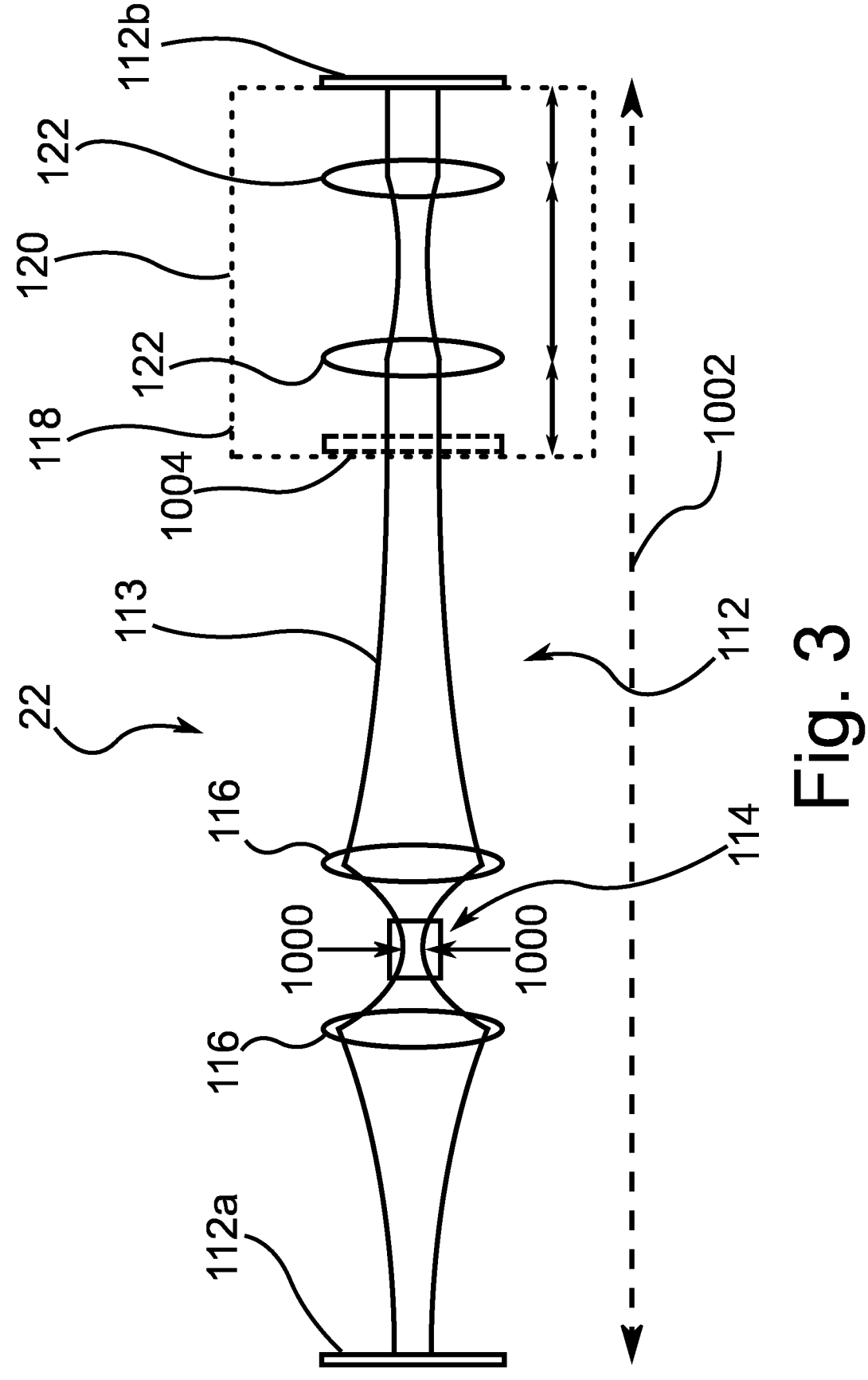
FIG. 3 schematically illustrates a Cr-doped II-VI laser oscillator system according to an exemplary embodiment having a resonator cavity and being adapted to emit laser pulses from the resonator cavity having a peak power of at least 0.75 MW.

FIG. 3 schematically illustrates a Cr-doped II-VI laser oscillator system 22 according to an exemplary embodiment having a resonator cavity 112 and being adapted to emit laser pulses from the resonator cavity 112 having a peak power of at least 0.75 MW.

The laser oscillator system 22 comprises a resonator cavity 112 for confining an intra-cavity laser beam 113. At both ends of the resonator cavity 112 a respective cavity mirror 112a, 112b is arranged. The cavity mirrors 112a, 112b may also be referred to as end minors. According to an exemplary embodiment, one of the cavity mirrors 112a, 112b may comprise the functionality of an out-coupler for coupling a part of the intra-cavity laser beam 113 out of the resonator cavity 112. For instance, the cavity mirror 112a forming the outcoupler may be partly transparent for transmitting a small fraction of the intra-cavity laser beam 113.

Moreover, the laser oscillator system 22 comprises a Cr-doped II-VI gain medium 114 serving as a laser active medium. According to the presented exemplary embodiment the gain medium 114 may be a Cr:ZnSe or a Cr:ZnS gain medium which is well suited of amplifying optical radiation in a spectral range from about 1.8 $\mu$m to 3.0 $\mu$m. The gain medium may be directly diode-pumped by suitable laser diodes (not shown). For shaping the intra-cavity laser beam 113 to exhibit a suitable spot size 1000, i.e., a suitable beam waist, at and within the gain medium 114, two optical elements 116 are provided for focusing and collimating the intra-cavity laser beam 113 accordingly. The optical elements 116 may be provided as optical lenses.

According to the presented exemplary embodiment the gain medium 114 not only serves as the laser active medium for amplifying the intra-cavity laser beam 113 but also serves as a Kerr medium for achieving Ken-lens modelocking for the laser oscillator system 22. In other words, the gain medium 114 combines gain medium and Kerr-medium in one and the same element. According to other exemplary embodiments, the laser oscillator system 22 may comprise a Kerr medium (not shown) separate from the gain medium 114 allowing to independently adjust the gain and the modelocking.

The laser oscillator system 22 additionally comprises an imaging unit 118 for decoupling the spot size 1000 of the intra-cavity laser beam 113 from an intra-cavity length 1002 of the resonator cavity 112 indicated as a dashed double-arrow. According to the presented exemplary embodiment the imaging unit 118 is formed by a 4f-telescope 120 in the vicinity of the cavity minors 112b (in this case, f denotes the focal length of the telescope lenses). The 4f-telescope comprises two optical lenses 122 each having a focal length, wherein the two optical lenses 122 are arranged in a distance of twice the focal length from each other, as indicated by the arrows. Moreover, one of the optical lenses 122 is placed in a distance corresponding to the focal length from the cavity mirror 112b. The imaging unit 118, thus is configured to image the intra-cavity laser beam 113 from an image plane 1004 to the cavity mirror 112b placed adjacent to the imaging unit 118. Hence, the optical configuration of the resonator cavity 112 including the imaging unit virtually provides an image of the cavity minor 112b in the image plane 1004. The resonator mode of the intra-cavity light beam 113 in the part of the resonator cavity 112 extending from the left cavity mirror 112a to the image plane 1004, thus, defines the resonator mode in the same manner as the resonator mode would be if the right cavity mirror 112b was placed in the image plane 1004. The extension of the intra-cavity length 1002 of the resonator cavity 112 provided by the imaging unit 18, thus, does not alter the resonator mode and in particular does not influence the spot size 1000 of the intra-cavity laser beam 113 at the gain medium 114. This is in contrast to a mere extension of the intra-cavity length 1002 of the resonator cavity 112 without an imaging unit 118, in which case due to the reconfiguration of the intra-cavity laser beam 113 by the shifting of cavity minors 112a and 112b, the beam waist would change with increased intra-cavity length 1002.

Due to the extended length of the resonator cavity 112 by using the imaging unit 118 the repetition rate of the laser oscillator system 22 is reduced compared to the case of placing the cavity mirror 112b in the imaging plane 1004. By this, a repetition rate of 50 MHz or less may be realized. In some exemplary embodiments repetition rates of 40 MHz or less or even 30 MHz or less may be realized. The reduced repetition rates allow achieving higher pulse energies and, hence, a higher peak power of the emitted laser pulses, since the average laser output power (which essentially remains unchanged) is concentrated into a reduced number of pulses. In particular, the presented exemplary embodiment is capable of realizing a repetition rate of 40 MHz corresponding to an intra-cavity length of 3.75 m or a repetition rate of 25 MHz corresponding to an intra-cavity length of 6.0 m. Accordingly, the laser oscillator system may be capable of providing femtosecond laser pulses having a peak power of 1 MW or more.

According to an exemplary embodiment, the laser oscillator system 22 has a tunable intra-cavity resonator length. For instance, the position of the cavity minor 112b and optionally of the imaging unit 118 may be moved in order to shorten and/or extend the intra-cavity length 1002 of the resonator cavity 112. For instance, the length of the resonator cavity may be tunable in a continuous manner and/or may be stepwise tunable. According to some exemplary embodiments, the intra-cavity length 1002 of the resonator cavity 112 may be changed to some degree without requiring a change of the optical elements 122 of the imaging unit 118. According to some exemplary embodiments, a change of the intra-cavity length 1002 of the resonator cavity 1112 may require replacing at least one of the optical elements 122 by a different optical element having a different focal length.

The laser oscillator system 22 according to the presented exemplary embodiment may be used for determining and/or stabilizing the CEO in order to provide CEO-stabilized laser pulses. In particular, the laser oscillator system 22 may be adjusted to provide CEP-stabilized pulses. In particular, the laser oscillator system does not require any external laser amplifier stage for achieving a suitable pulse energy and peak power for carrying out the determination and/or control of the CEO and using the CEO-stabilized pulses for a desired application.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 10 laser pulse
12 carrier optical wave
14 envelope
16 spectral power density
18 spectral component/frequency spike
20 laser system
22 laser oscillator system
24 optical path of laser pulses
26 nonlinear optical element for spectral broadening
28 optical element
30 steering mirror
32 beam splitter
34 frequency-doubling element
36 optical element
38 steering mirror
40 f-2f-interferometry device
42 photodiode
44 spectral bandpass filter
112 resonator cavity
112a, 112b cavity mirror/end mirror
113 intra-cavity laser beam
114 gain medium
116 optical elements
118 imaging unit
120 4f-telescope 122 optical elements of imaging unit
1000 spot size/beam waist at gain medium
1002 intra-cavity length of resonator cavity
1004 image plane of 4f-telescope
CEO carrier-envelope-offset

The invention claimed is:

1. A laser system for generating laser pulses having a determined carrier-envelope-offset, CEO, the laser system comprising:

a Cr-doped II-VI based laser oscillator system having a resonator cavity, wherein the laser oscillator system is configured to emit laser pulses from the resonator cavity having a peak power of at least 0.75 MW;

a nonlinear optical element for spectrally broadening at least a part of the emitted laser pulses irradiated onto the nonlinear optical element to provide the laser pulses with octave-spanning spectral components;

a frequency-doubling element for generating second harmonic spectral components of at least a part of the octave-spanning spectral components of the spectrally broadened laser pulses when irradiating the spectrally broadened laser pulses onto the frequency-doubling element, such that a part of the second harmonic spectral components spectrally overlap with a part of the remaining octave-spanning spectral components of the laser pulses, wherein the nonlinear optical element for spectrally broadening and the frequency-doubling element are separate elements; and an f-2f-interferometry device for generating a beating signal of at least a part of the overlapping spectral components exiting the frequency-doubling element and interfering with each other at the f-2f-interferomtry device and for determining and/or controlling the CEO of the emitted laser pulses based on the beating signal.

2. The laser system according to claim 1, wherein overlapping second harmonic spectral components exiting the frequency-doubling element propagate collinearly and temporally overlapping with residual fundamental spectral components along a common optical path.

3. The laser system according to claim 1, wherein the beating signal is generated only by the interfering overlapping spectral components of the second harmonic spectral components and the octave-spanning spectral components of the laser pulses remaining after the frequency-doubling element.

4. The laser system according to claim 1, further comprising a spectral filter element for spectrally filtering the overlapping spectral components prior to generating the beating signal.

5. The laser system according to claim 1, wherein controlling the CEO of the emitted laser pulses comprises adjusting the laser oscillator system such as to emit laser pulses having a predetermined CEO.

6. The laser system according to claim 5, wherein adjusting the laser oscillator system comprises adjusting an internal dispersion of the resonator cavity and/or adjusting a pumping power for pumping the gain medium of the laser oscillator system and/or adjusting an internal optical loss of the resonator cavity.

7. The laser system according to claim 1, wherein controlling the CEO comprises stabilizing the CEO to a predetermined CEO.

8. The laser system according to claim 1, wherein the nonlinear optical element for spectrally broadening has a thickness of 1 mm or less.

9. The laser system according to claim 1, wherein the nonlinear optical element for spectrally broadening comprises or consists of rutile $TiO_2$.

10. The laser system according to claim 1, wherein the Cr-doped II-VI based laser oscillator system comprises a gain medium comprising or consisting of Cr-doped ZnS and/or Cr-doped ZnSe.

11. The laser system according to claim 1, wherein the Cr-doped II-VI based laser oscillator system comprises an imaging unit forming part of the resonator cavity, wherein the imaging unit is adapted to decouple a spot size of an intra-cavity laser beam at a gain medium from an intra-cavity length of the resonator cavity, and wherein the resonator cavity and the imaging unit are configured such that the laser oscillator system emits laser pulses at a repetition rate of 50 MHz or less.

12. The laser system according to claim 11, wherein the imaging unit includes an end mirror of the resonator cavity.

13. The laser system according to claim 12, wherein the imaging unit is configured to image the end mirror of the resonator cavity included in the imaging unit to an image plane, and wherein the imaging unit is adapted to maintain a distance of the image plane from another end mirror of the resonator cavity unchanged when adapting a length of the resonator cavity by the imaging unit.

14. The laser system according to claim 1, wherein the laser oscillator system is configured to emit laser pulses having a pulse duration of 40 fs FWHM or less.

15. The laser system according to claim 1, wherein the laser system is configured such that the beating signal has a signal-to-noise ratio of 40 dB or more measured at a radio-frequency resolution bandwidth of 100 kHz.

16. The laser system according to claim 1, further comprising a diode-based pump source for optically pumping a gain medium of the Cr-doped II-VI based laser oscillator system.

17. The laser system according to claim 16, wherein the diode-based pump source comprises one or more light-emitting diodes and/or one or more laser diodes.

18. A method for generating laser pulses having a determined carrier-envelope-offset, CEO, the method comprising:

providing laser pulses having a peak power of at least 0.75 MW and spectral components in a range from 1.8 μm to 2.4 μm emitted from a resonator cavity of a Cr-doped II-VI based laser oscillator system;

spectrally broadening the laser pulses in a nonlinear optical element for spectrally broadening to provide the laser pulses with octave-spanning spectral components;

generating second harmonic spectral components of at least a part of the octave-spanning spectral components of the spectrally broadened laser pulses in a frequency-doubling element, such that a part of the second harmonic spectral components spectrally overlap with a part of the remaining octave-spanning spectral components of the laser pulses, wherein the nonlinear optical element for spectrally broadening and the frequency-doubling element are separate elements;

generating a beating signal of at least a part of the overlapping spectral components exiting the frequency-doubling element and interfering with each other at an f-2f-interferometry device; and determining and/or controlling the CEO of the emitted laser pulses based on the beating signal.

19. The method according to claim 18, wherein controlling the CEO of the emitted laser pulses comprises adjusting the laser oscillator system such as to emit laser pulses having a predetermined CEO.

\*    \*    \*    \*    \*